(12) United States Patent
Meron

(10) Patent No.: US 9,323,732 B2
(45) Date of Patent: Apr. 26, 2016

(54) AUTOMATIC WEBSITE ACCESSIBILITY AND COMPATIBILITY

(75) Inventor: Amichai Meron, Kiryat Ono (IL)

(73) Assignee: User First Ltd., Tel Aviv (IL)

( * ) Notice: Subject to any disclaimer, the term of this patent is extended or adjusted under 35 U.S.C. 154(b) by 71 days.

(21) Appl. No.: 14/236,117

(22) PCT Filed: Aug. 5, 2012

(86) PCT No.: PCT/IL2012/050384
§ 371 (c)(1),
(2), (4) Date: Jan. 30, 2014

(87) PCT Pub. No.: WO2013/021391
PCT Pub. Date: Feb. 14, 2013

(65) Prior Publication Data
US 2014/0180846 A1 Jun. 26, 2014

(30) Foreign Application Priority Data
Aug. 4, 2011 (IL) .......................... 214468

(51) Int. Cl.
G06Q 30/00 (2012.01)
G06F 17/22 (2006.01)
G06F 17/30 (2006.01)
G06Q 30/02 (2012.01)

(52) U.S. Cl.
CPC ........ *G06F 17/2247* (2013.01); *G06F 17/3089* (2013.01); *G06Q 30/0277* (2013.01)

(58) Field of Classification Search
CPC .......................... G06F 17/30899; G10L 13/00
USPC ........................................................ 705/14.1
See application file for complete search history.

(56) References Cited

U.S. PATENT DOCUMENTS

2007/0211071 A1* 9/2007 Slotznick .......... G06F 17/30899
345/594

* cited by examiner

*Primary Examiner* — Daniel Lastra
(74) *Attorney, Agent, or Firm* — Edward Langer, Adv. & Patent Attorney

(57) ABSTRACT

A method for an accessibility solution provided as a software. The method includes approving or implementing by a website owner of a code into his website and receiving web format by a user device by "scraping" the data from the website pages or by other means of using client side plugin, server side plugin, browser or $3^{rd}$ party server side or mobile app. The method also includes analyzing the data over the user device or on the server side and clicking a button by the end-user and the original code and the content and code that were collected from the website are rewritten which can also be done automatically as a suggestion to the end user, and the end-user sees or can use a new format according to the updated standard.

11 Claims, 14 Drawing Sheets

AUTOMATIC WEBSITE ACCESSIBILITY AND COMPATIBILITY

FIELD OF THE INVENTION

The present invention relates generally to website functionality and more particularly to enabling accessibility and compatibility over the website interface, advertising and code

BACKGROUND OF THE INVENTION

The World Wide Web Consortium (W3C) is the main international standards organization for the World Wide Web (WWW). Web Content Accessibility Guidelines (WCAG) is part of a series of Web accessibility guidelines published by the W3C's Web Accessibility Initiative. They consist of a set of guidelines on making websites content accessible, primarily for disabled users, but also for all user agents, including highly limited devices, such as mobile phones, pads, TV and any devices that can host software using a Document Object Model (DOM) format. The current version is WCAG 2.0.

The WCAG 1.0 was published and became a W3C recommendation on May 5, 1999. They have since been superseded by WCAG 2.0.

WCAG 1.0 and 2.0 have three priority levels with a set of requirements:
  Priority 1: Web developers must satisfy these requirements, otherwise it will be impossible for one or more groups to access the Web content. Conformance to this level is described as A.
  Priority 2: Web developers should satisfy these requirements, otherwise some groups will find it difficult to access the Web content. Conformance to this level is described as AA or Double-A.
  Priority 3: Web developers may satisfy these requirements to make it easier for some groups to access the Web content. Conformance to this level is described as AAA or Triple-A.
  WCAG 2.0 was published as a W3C Recommendation on Dec. 11, 2008. The lengthy consultation process prior to this encouraged participation in editing by the Working Group, with diversity assured by inclusion of accessibility experts and members of the disability community.

Accessibility is defined according to market standards and user needs, such as impaired vision, mental, physical and hearing disabilities of various kinds. For example, web accessibility is being defined today by WCAG2.0 standard and through other W3C standards, but since the market standard may change, the present invention is independent of any specific market standard.

In addition legislation has been taken to define web accessibility under the law, as under ADA title II and title III, section 508 in USA, AODA in Canada, ADD in Australia and UK as well as in many other countries around the world, only some of whom are following WCAG.

Thus, it would be advantageous to provide a method, plugin, application or service for generating website content and code from being non accessible to accessible, as a semi automatic process or as an automatic process.

SUMMARY OF THE INVENTION

Accordingly, it is a principle object of the present invention to provide a method and application for enabling inaccessible or incompatible website content and code to become accessible or compatible for different machines.

it is another principle object of the present invention to provide a method and application through an automatic or semi-automatic process.

Inaccessibility can occur in two ways:
 1. an interface may be inaccessible for the physically challenged; and
 2. an interface may be inaccessible as a result of technologies and platform mismatch.

For example access may be enabled by displaying "flash" over an Apple iPhone considered to be blocked by Apple;

For another example a website interface may be incompatible for different devices, such as mobile phone, TV and note pad because of non-adaptable code and content. This may be overcome by providing enabling tools for the disabled in the form of screen readers.

For another example an interface may be incompatible due to the size of the device screen, or the screen size of the end-user.

The method of the present invention includes a process of scraping/harvesting or and mapping the all the content from the website pages by recognizing and analyzing each website patterns and re-presenting it with accessibility standards, or by fixing the original code, content and structure of the original website or page.

The method also includes processing and analyzing the content of the site over the server or client side and making it fit to the electronic device and according to the accessibility standards.

The process is done automatically or manually following the end-user request or without the end user request. The original code, interface, and content of the website's pages are rewritten represented and or fixed allowing the end-user to receive the same content in a new format according to the updated standard and the user profile and needs.

For clarification, a method that harvests, scrapes or maps the content, interface and code, is a method that analyses the DOM formats: HTML; CSS; and XML, by predefining the website patterns over the server side or over the client side, through an automatic or semi-automatic process, in order to learn about the structure of the page, rather than its content, and to deduce from the structures the content essence rather than its meaning, for example: a "Title of a product in a gallery of products" is the essence rather than its particular name as: "Camera Canon 350DP1 model Y34."

The accessibility solution of the present invention is provided via a plug-in, JavaScript, tool bar, software as a services, app, browser or as other software alternative . . . . For example, the website owner may implement a code into his website. The process can be performed automatically, semi-automatically or through an API, over the server side of the website, and/or over the server side of the content management system (CMS) and/or over the client side and/or other solutions familiar to those skilled in the art.

The data can preferably be scraped, harvested or mapped from the website pages and/or fixed on the website page, and then may be analyzed over the user's browser, or alternatively by a screen reader or other relevant end-user device or over the server side. For example, a manual change is performed by the end-user clicking on an "initiate accessibility" button in order to request a change from non-accessible to accessible or generally thereafter automatically, depending on the machine's decision to show/not show to this user in cases where the user didn't asked for it. The website will be displayed in accessible format for the user according to his profile, such as a color blind disability, while the original code and content collected from the website will be rewritten, represented or fixed.

By clicking on an "initiate accessibility" button, at any time, or from any website, the user will be provided with a cookie or other tracking method. From this moment on, as long as the user will not ask to halt the service, or in case the machine will recognize the need to change the display, or the cookie or other tracking method will reach its expiration, the user can or will see accessibly in all websites to which this method applies.

In order to reach accessible interface cross devices and cross resolutions, the page layout is preferably rearranged. For example, rearrangement may be performed by adding navigation to the page, by a layout change or by other features of HTML, or other code. Rearrangement may be performed visually or by means of other properties to the original HTML as features of the specific device. This process can be performed by adding another layer to the HTML and wrapping the new layout in an iframe tag, which acts as an interface between the website, the end user and $3^{rd}$ party servers having a different URL.

In some embodiments the present invention relates to a method and application for modifying any advertisement banner or text-ad content, which is considered to be a part of the website page and content, in the form of code, format, design or other aspect from non-accessible to accessible for any platform or device, in order to accommodate a variety of user needs. This may be done semi-automatically or fully automatic.

This service will take place over the user's browser, or by means of computer software, mobile software, TV software, or other device or software. The transformation of the banner/ad-text will be generated over the server side or over the client's software or over the ad network's services.

The content and code collected from the ad, will be represented and the user will see a new format. The new format includes the change of code and content according to the standard and user device, e.g. mobile, laptop, desktop, note pad, etc. The ad will be replaced with the same ad in a different format, by changing the name, URL or other property the ad.

The present invention also relates to a method of building profiles for each category of disability, such that each user will be related to a specific category of profile, or will have a single-feature profile The present invention also relates to a method and application for replacing any image or text over the web page, e.g. JPG, GIF, SWF or ad-text formats, from non-accessible format to accessible format. An accessible banner/ad-text is an advertisement which can be displayed over any machine to accommodate various disabilities and needs, such as visual, mental, hearing or motor disabilities, as well the display of a flash banner replaced with an ad-text banner over any software, considered to be blocked by Apple, or an interface incompatible for devices such as mobile phone, TV and note pad for inadaptable code and content provided to the disabled user's assistive tools, such as a screen reader.

There are 2 scenarios in which a banner/ad-text changes and becomes accessible:

1, The user clicks on an "initiate accessibility" button. This action can occur anytime, anywhere by the user, not necessarily over the particular page the user is viewing at that moment. By clicking this button, the user will be provided with a cookie, or any other tracking method. From this moment on, as long as the user will not ask to halt the service, or in case the machine will recognize the need to change the display, or the cookie or any other tracking method will reach its expiration date, the user will see accessible ads.

By using a cookie or other tracking device at the user machine, the banner will change its format from being an inaccessible image to an ad-text or other format of image or code which can be read by a machine, or as a machine format as an API service directly to a screen reader or other device. From inaccessible to accessible means cases where the Ad-text/banner has excessively small fonts, such as for Google ad-texts, the size will be adjusted according to the user's visual abilities. If the Ad-text/banner doesn't have a method of moving from one line to the other as a tab index, it will be added. Other standards or legislation for accessibility demand will be met similarly.

This process may be provided for profiling, such that each user will be related to a specific category of profiles, or will have a single-feature profile for a certain disability. E.g., a movement disability requiring a tab index inside the banner may allow the user to move between lines. In another example a blind user may prefer that text be coded in a format following WCAG and adjusted to his machines.

2. The machine will be able to recognize an environment where the banner cannot be displayed or is displayed in a inaccessible fashion. The machine will automatically change the banner. The process of changing from inaccessible to accessible is based on naming, adding an HTML tag, using an existing HTML tag or through using a content management system replacing the banner on the server side or on the client side.

The method of replacing a banner to become accessible doesn't depend on the WCAG standard only, but also on technical barriers for non-accessible interface as a result of technologies and platforms mismatch. E.g., flash over iPhone considered to be blocked by Apple will become the ad-text.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

For a better understanding of the invention with regard to the embodiments thereof, reference is now made to the accompanying drawings, in which like numerals designate corresponding elements or sections throughout, and in which.

DETAILED DESCRIPTION OF AN EXEMPLARY EMBODIMENT

The principles and operation of a method and an apparatus according to the present invention may be better understood with reference to the drawings and the accompanying description, it being understood that these drawings are given for illustrative purposes only and are not meant to be limiting.

Figure 1:
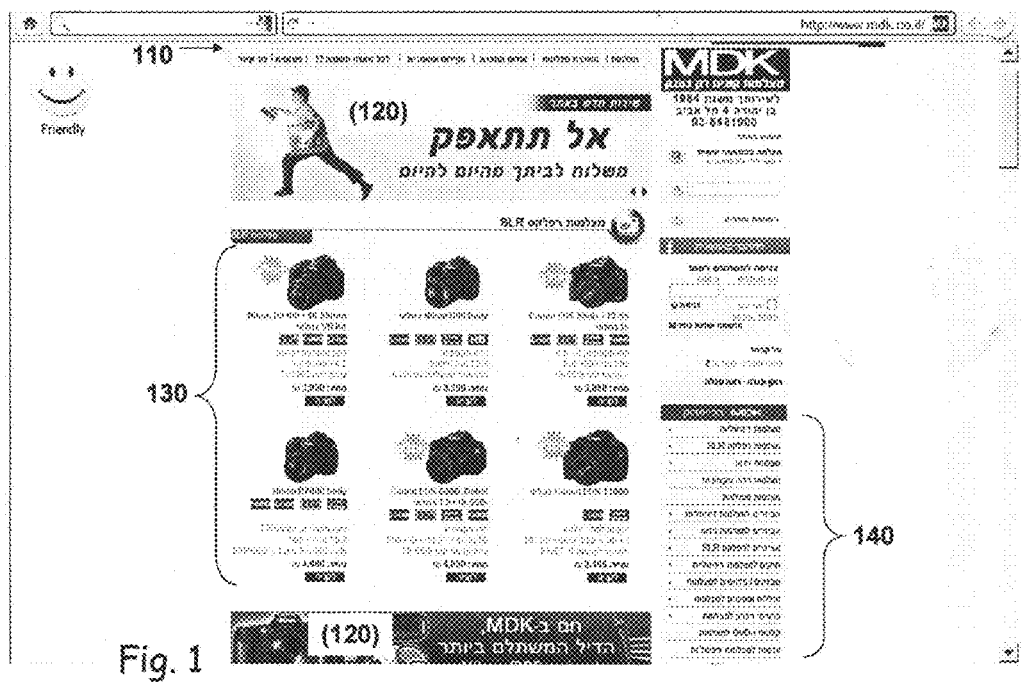
FIG. 1 is a screenshot of a prior art web page.

FIG. 1 is a screenshot of a prior art web page. An "Initiate accessibility" button 110, banners 120 and a specific product/item gallery 130 are shown.

Figure 2:
FIG. 2 is a screenshot of a newly designed accessible web page transformed from the prior art web page of FIG. 1, constructed in accordance with the principles of the present invention.

FIG. 2 is a screenshot of a newly designed accessible web page transformed from the prior art web page of FIG. 1, constructed in accordance with the principles of the present invention. The gallery of items 230 are shown reformatted and page navigation is shown 240

Figure 3:
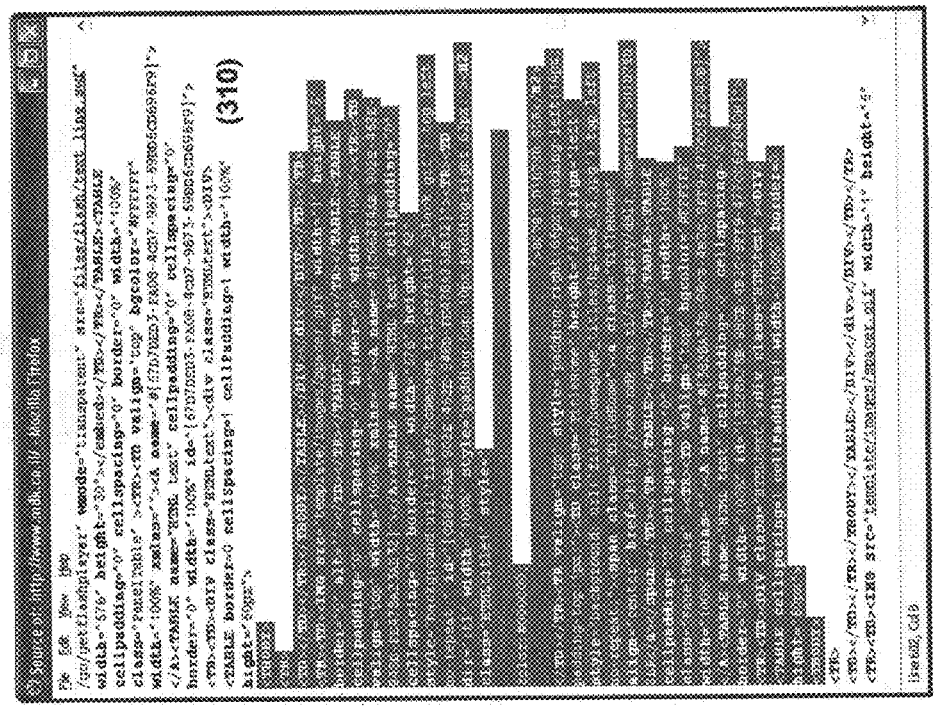
FIG. 3 is a screenshot of the Original Code embedded as a mix of content and code, constructed in accordance with prior art.
Figure 4:
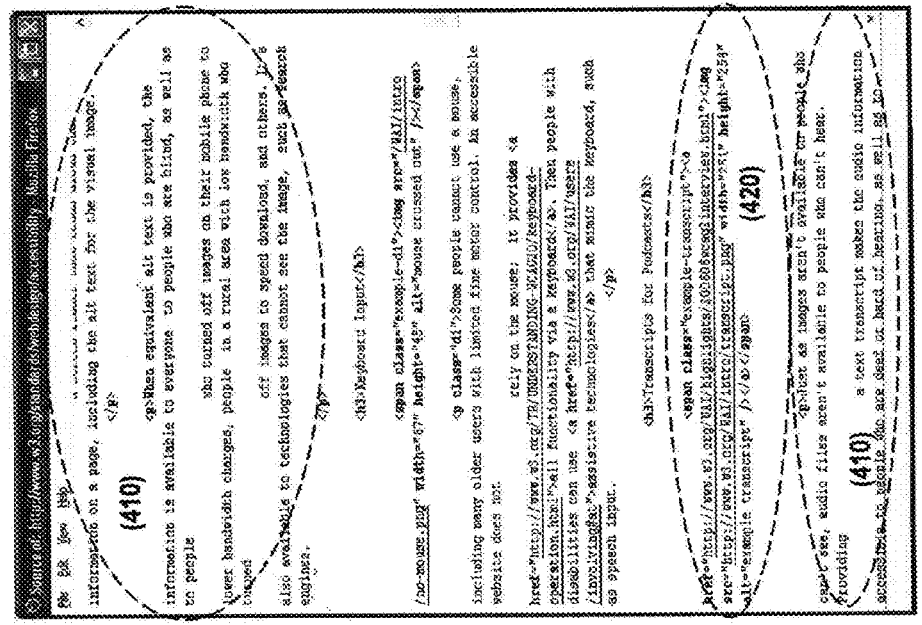
FIG. 4 is a screenshot illustration of the New Code formatted to provide separation of content and code, constructed in accordance with the principles of the present invention.

FIG. 3 is a screenshot of an Original Code embedded as a mix of content, styles, layout and code 310, constructed in accordance with prior art FIG. 4 is a screenshot illustration of a New Code formatted to provide separation of content and style 410, constructed in accordance with the principles of the present invention. The changes shown on the front end graphic user interface (GUI) are no more important than the changes to the backend code. Having the code written according to the standard, any machine can read and better understand the content and format, allowing users with disabilities and assistive tools to read the code and content.

The website owner will need to embed a code into his website pages code. Alternatively, this can be done over the CMS which created the website over a plugin or software over the client side. The end-user machine will have a cookie inserted or other tracking method, allowing this user to enter other websites with the same service and to automatically receive changed content, preferably without any further button-clicking.

By originally clicking his "initiate accessibility" button, or by any tracking method known to those skilled in the art, the user will have a cookie added. This will be true until:

the user will act to request a change;

In case the machine will recognize the need to change the display; or

The cookie or any other tracking method will reach its expiration date.

The user will automatically see accessible ads format and any content.

By using a tracking device, such as a cookie, at the user machine, the banner will change its format from being an image not accessible to blind people, for example, to ad-text which can be read by a machine. Ad-text which has excessively small fonts, such as Google ad text, will be changed to be adjusted according to the user visual abilities.

This process will provide for profiling, such that each user will be related or will have a single-feature profile of a certain disability, such as movement disability requiring a tab index inside the banner to allow the user to move between lines. In another example a blind user will require that text be coded in a format following WCAG and adjusted to his machines, etc.

Figure 5:
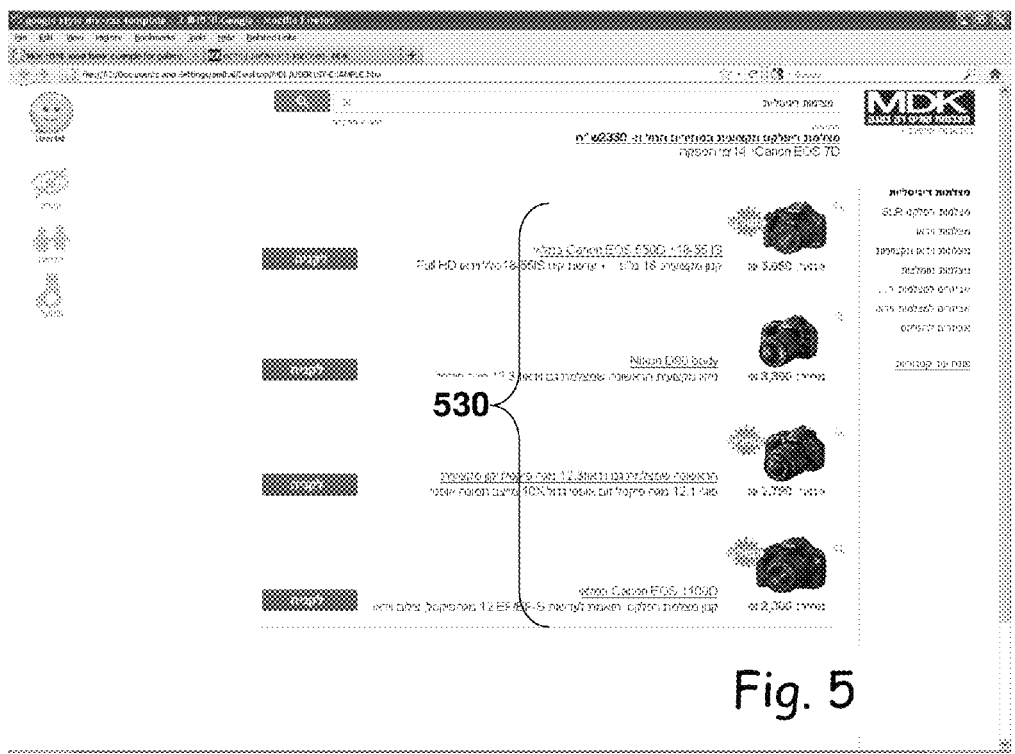
FIG. 5 is a screenshot illustration of the detailed redesigned webpage, constructed in accordance with the principles of the present invention.

FIG. 5 is a screenshot illustration of the detailed redesigned webpage, constructed in accordance with the principles of the present invention. Specific product offerings 530 are shown reformatted. 540 is an accessible ad.

Figure 6:
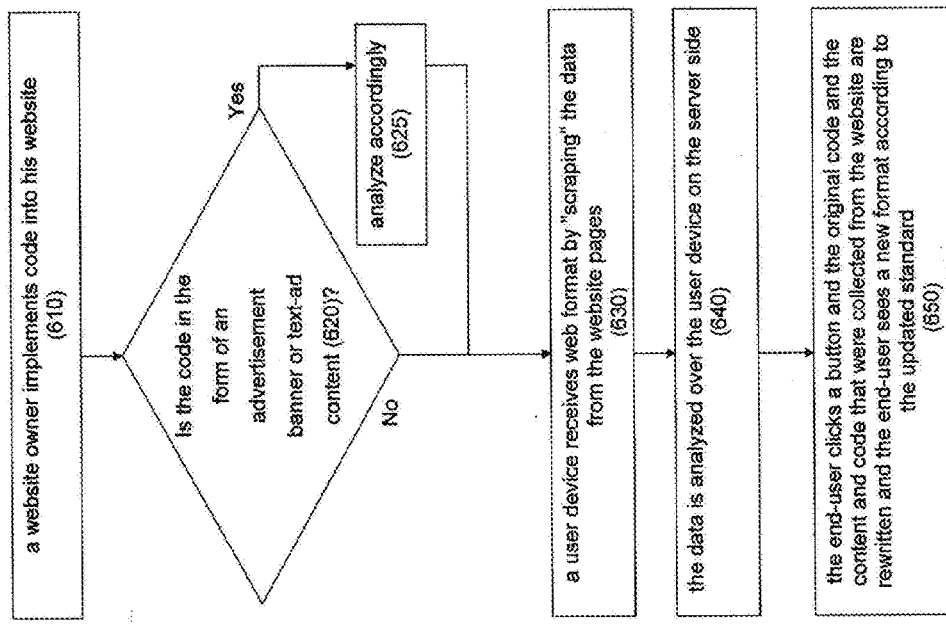
FIG. 6 is a flowchart illustration of the website accessibility method, constructed in accordance with the principles of the present invention.

FIG. 6 is a flowchart illustration of the website accessibility method, constructed according to the principles of the present invention. The administrator signs into an administrative site and applies a website URL (610). Is the administrator given widget patterns with this website OR does he define them? (620). If the administrator is supplied with a set of instructions and tools to insert into the website (630), after using the supplied tools, the website is provided with a "accessible button" and script (640). If the administrator defines a set of instructions and tools to insert into the application (650), the end-user downloads and installs the application(660). In either case the end-user is now enabled to see and use an accessible website (670)

Figure 7A:
FIGS. 7a-7c are 3 schematic illustration exemplifying banner ads, constructed according to the principles of the present invention.
Figure 7B:
Figure 7C:

FIGS. 7a-7c is 3 schematic illustration exemplifying banner ads, constructed according to the principles of the present invention.

FIG. 7a Example banner 1:

Process example: The exemplary banner file is named: "user1st.BUY_NOW!B-in_100USD_ iPhone_on_eBay . U.0BAD07.-ebay:www.ebay.com.jpg," or the system will use optical character recognition (OCR) to read the banner, or the banner will be followed with another textual format or the banner URL will include all the context of the banner.

The script will find all the ads on the page starting with: "user1st," or any other naming indication, and will replace the original ad 710 with text or with text 720 and image according to the given context. FIG. 7b Exemplary banner ad 2 shows an original ad 730 and a new accessibly designed ad 740 and a new accessibly designed ad translated to English.

FIG. 7c Exemplary banner 3:

Eventually each user will be able to see a different banner. The original ad-text 750 is formatted according to his abilities/disabilities/software he is using 761 or 762.

Figure 8:
FIG. 8 is a screenshot illustration of mobile compatibility and accessibility adapted from a website, presenting the original website adapted to the laptop and desktop screens and subsequently adapted to the screen of a user's mobile phone, constructed in accordance with the principles of the present invention.

FIG. 8 is a screenshot illustrating mobile phone 820 compatibility and accessibility adapted from a website, constructed according to the principles of the present invention. FIG. 8 presents the original website adapted to the laptop and desktop screens 810 and the same webpage adapted to the mobile phone screen 821.

Figure 9:
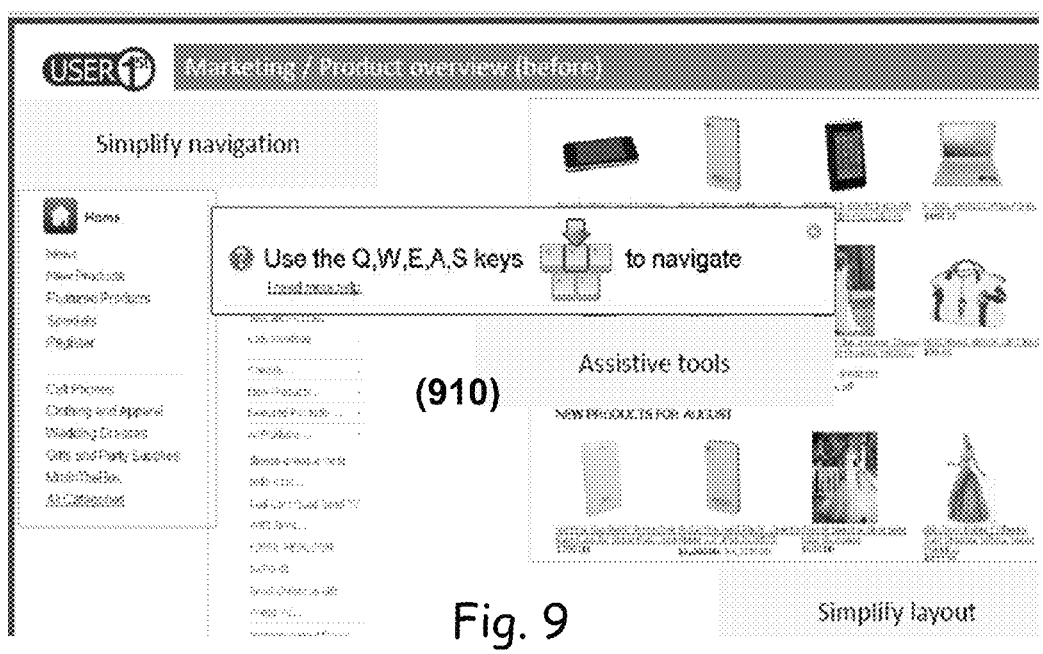
FIG. 9 is a screenshot exemplifying data added to the original screen, and in particular a help layer or layers for this website, constructed in accordance with the principles of the present invention.

FIG. 9 is a screenshot exemplifying data added 910 to the original screen, and in particular a help layer or layers for this website, constructed in accordance with the principles of the present invention.

Figure 10:
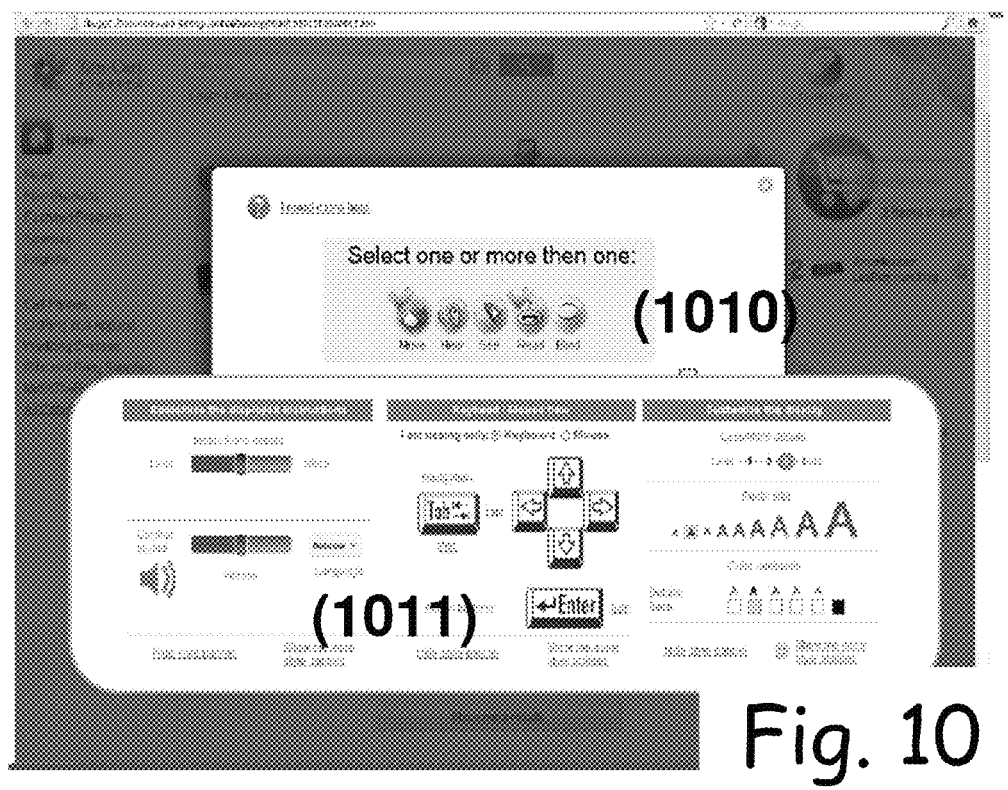
FIG. 10 is a screenshot exemplifying customization abilities and profiling selection alternatives, constructed in accordance with the principles of the present invention.

FIG. 10 is a screenshot exemplifying customization capabilities 1010 and profiling selection alternatives 1011, constructed in accordance with the principles of the present invention.

Figure 11:
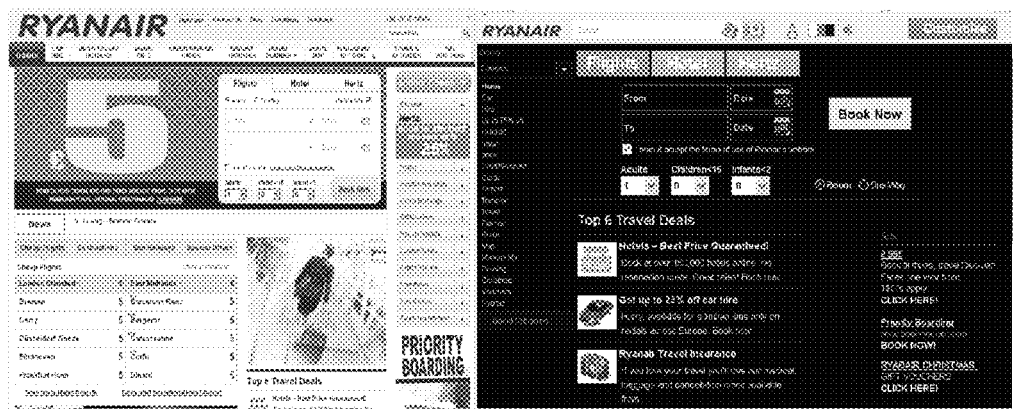
FIG. 11 is a customized screenshot result, where the user has defined the colors of the page to transform to their contradict color, constructed in accordance with the principles of the present invention.

FIG. 11 is a customized screenshot result, where the user has defined the colors of the page to transform to his contradict color scheme, constructed in accordance with the principles of the present invention. Initially, the colors are black text over white background 1101, and after the change the colors are white text over black background 1102.

Figure 12:
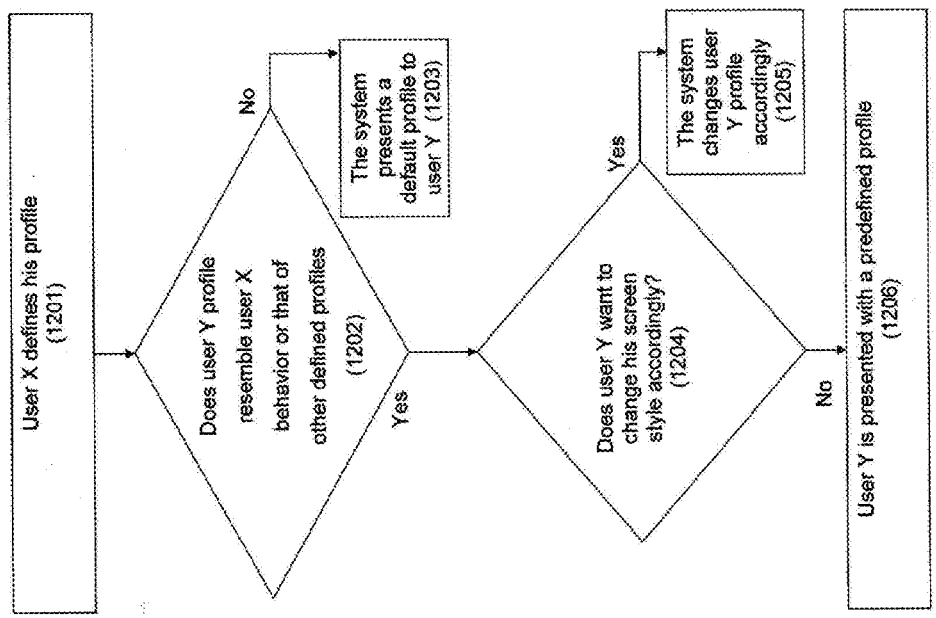
FIG. 12 is a flowchart illustration wherein the user defines his profile, constructed according to the principles of the present invention.

FIG. 12 is a flowchart illustration of the profile accessibility method, constructed in accordance with the principles of the present invention. User X defines his profile (1201). If user Y profile is not found to resemble user X behavior or that of other defined profiles (1202), the system presents a default profile (1203) to user Y. If user Y profile is found to resemble user X behavior or that of other defined profiles (1202), user Y is asked whether he wants to change his screen style accordingly (1204), and if so the system changes user Y profile accordingly 1205; if not user Y is presented with a predefined profile (1206).

Having described the invention with regard to certain specific embodiments thereof, it is to be understood that the description is not meant as a limitation, since further embodiments and modifications will now become apparent to those skilled in the art, and it is intended to cover such modifications as fall within the scope of the appended claims.

The invention claimed is:

1. A method for an automatic accessibility solution to website pages provided for a plurality of users in accordance with predefined standards, on the client side and/or browser, said method comprising:
   approving by a website owner, an implementation code associated with the accessability solution, for installation into his website;
   receiving formatted website pages associated with said website from a user device by scraping data from said formatted website pages;
   analyzing the data presented to the user device wherein the data originates on the website server side or the client side,
   wherein analyzing includes using a cookie or other tracking device, associated with the user device, to identify the user device as requiring the accessability solution,
   and further analyzing said formatted website pages for their associated DOM (Document Object Model) format representing their page structure, said page structure providing their content essence; and
   clicking a button by an end-user, causing rewriting of original code associated with said content essence and content that were collected from said formatted website pages, or converting said original code and content by a screen reader,
   such that the end-user sees a new presentation format on said website pages according to said predefined standards,
   or hears a new format generated by a text to speech conversion performed by said screen reader.

2. The method of claim 1, wherein the software is provided via at least one of plug-in, JavaScript and tool bar server side solution as through a 3rd party service.

3. The method of claim 1, wherein the process is performed automatically, semi-automatically or through an API.

4. The method of claim 1, wherein the user device is one of a browser, a screen reader or any other end user device.

5. The method of claim 1, wherein the web format is at least one of html, flash, xml and any other known format.

6. The method of claim 1, further comprising building profiles for each of said plurality of users, said profiles sub divided into categories of profiles for each of a plurality of user disabilities, such that each user will be related to a specific category of profile, or will have a single-feature profile.

7. The method of claim 1, wherein the data is in the form of an advertisement banner or text-ad content.

8. The method of claim 7, wherein the advertisement banner or text-ad content is in the form of code, format or design.

9. The method of claim 7, wherein transformation of the banner/ad-text will be generated over the server side or over the client's software.

10. The method of claim 1, wherein the method is provided as a service.

11. A method for changing website pages from inaccessible to accessible is based on naming, adding an HTML tag, using an existing HTML tag or through using a content management system replacing the banner on the server side or on the client side.

* * * * *